United States Patent [19]

Hill

[11] 4,232,211
[45] Nov. 4, 1980

[54] AUTOMOBILE AUXILIARY HEATER

[76] Inventor: Johnnie E. Hill, 18272 Pinehurst, Detroit, Mich. 48221

[21] Appl. No.: 952,709

[22] Filed: Oct. 19, 1978

[51] Int. Cl.³ .............. B60H 1/02; F24H 3/02; H05B 3/00
[52] U.S. Cl. .................... 219/202; 98/2.05; 165/43; 165/126; 219/279; 219/367; 219/368; 219/370; 237/12.3 A
[58] Field of Search ............... 219/279, 202, 366–370; 98/2.05; 237/12.3 R, 12.3 A, 12.3 B; 165/41–43, 126

[56] References Cited

U.S. PATENT DOCUMENTS

| | | | |
|---|---|---|---|
| 2,602,878 | 7/1952 | Holody | 98/2.05 X |
| 3,300,619 | 1/1967 | Nilssen | 219/279 |
| 3,469,073 | 9/1969 | Zechin | 219/279 |

FOREIGN PATENT DOCUMENTS

| | | | |
|---|---|---|---|
| 2236152 | 2/1974 | Fed. Rep. of Germany | 219/202 |
| 1305867 | 8/1962 | France | 219/202 |

Primary Examiner—A. Bartis
Attorney, Agent, or Firm—Willis Bugbee

[57] ABSTRACT

To supply heat to the passenger compartment of an automobile car body immediately upon entering it, an approximately triangular housing has two branch outlet ducts converging from the opposite ends of a main inlet cross duct including a fan chamber containing a reversible electric fan. This fan initially draws cold air into the fan chamber of the main inlet cross duct and forces it through an electric heating coil and then through one of the two converging branch outlet ducts to a common outlet containing a freely pivoted damper which in response to the pressure of the forced air swings to cut off air flow from the other converging branch outlet duct and at the same time directs the heated air through a horizontal transverse duct into the passenger compartment. When the compartment has been thus heated preliminarily, the operator de-energizes the electric heating coil and reverses the fan, causing it to direct outside air through the conventional engine radiator-connected liquid heater of the automobile and then through the opposite converging branch outlet duct. Thereupon the thus-forced air causes the damper to swing to an opposite position, closing the first converging branch outlet duct and thenceforth supplying air heated by the conventional heater to the passenger compartment. Electricity for the electric heating coil is provided by the car alternator and/or storage battery.

9 Claims, 3 Drawing Figures

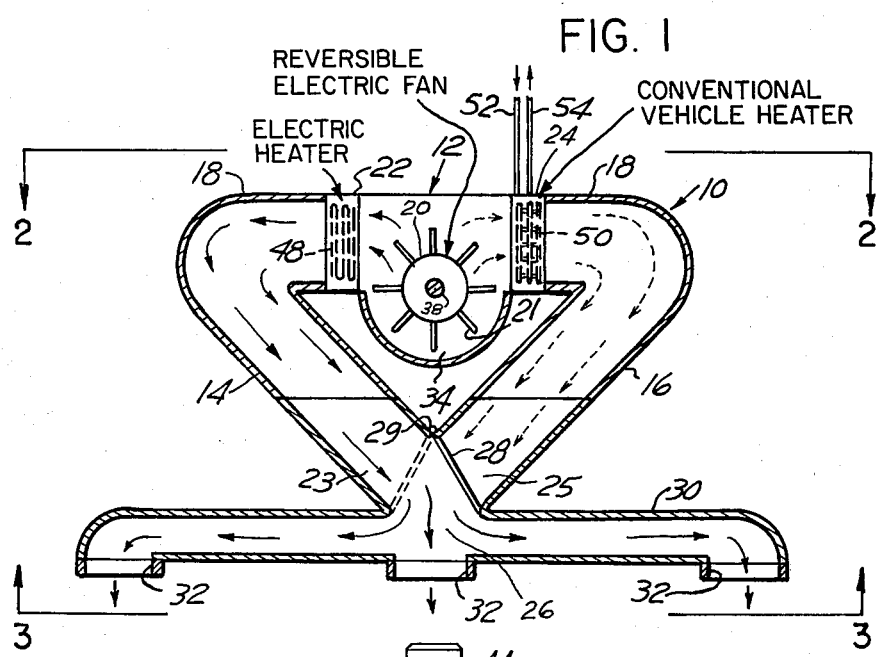
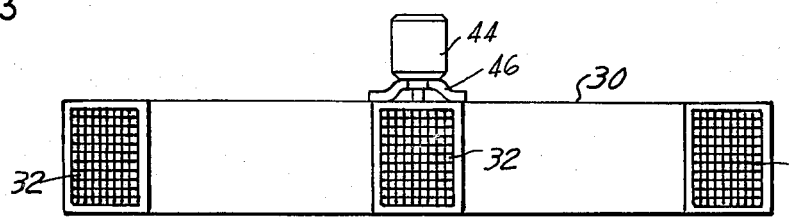
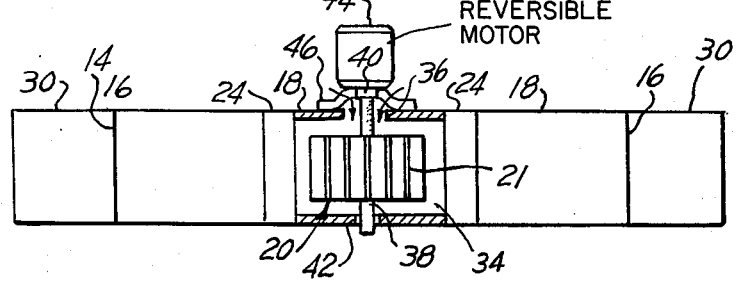

AUTOMOBILE AUXILIARY HEATER

BACKGROUND OF THE INVENTION

Complex systems for providing auxiliary heat from an electric heating coil to the passenger compartment of an automobile have been previously disclosed in prior patents assigned to two of the principal automobile companies. Such patents, however, have called for intricate electric circuits, controls and duct-work which the present invention simplifies.

SUMMARY OF THE INVENTION

The present invention provides a reversible electric fan which draws outside air into a main inlet cross duct and discharges it initially through an alternator-energized electric heating coil and thence through the first of two converging branch outlet ducts and thereafter discharges it through a radiator-connected liquid heating coil and thence through the second converging branch outlet duct, the flow of air being controlled by damper means located near the point of convergence of the two converging ducts.

In the drawing,

FIG. 1 is a sectional view of an automobile auxiliary heater according to one form of the invention;

FIG. 2 is a front elevation of the automobile auxiliary heater shown in FIG. 1, with a portion sectioned to more clearly show the air-propelling fan and looking in the direction of the arrows 2—2 therein from the direction of the automobile radiator in the front of the vehicle, with arrows indicating the incoming air flow direction; and FIG. 3 is a rear elevation looking in the direction of the arrows 3—3 in FIG. 1 from the direction of the automobile passenger compartment.

Referring to the drawing in detail, FIG. 1 shows an automobile auxiliary heater, generally designated 10, contained within a housing structure 12, of approximately triangular form having first and second converging branch outlet ducts 14 and 16 connected to and converging from the opposite ends of a main outside air inlet cross duct 18 containing a reversible electric fan 20 with fan blades 21. The first converging branch outlet duct 14 near its junction with the main outside air inlet cross duct 18 contains an electric heater 22, whereas the second converging branch outlet duct 16 near its junction with the main outside air inlet cross duct 18 contains the conventional automobile heat exchanger or liquid heater 24 which receives hot coolant liquid from the automobile engine cooling system, such as the radiator (not shown). The converging ducts 14 and 17 have individual outlet ports 23 and 25 leading to a common outlet port 26 containing a freely-swinging damper 28 mounted on a pivot shaft 29 and adapted to swing into a closing position for the outlet ports 23 or 25 of either of the converging ducts 14 or 16 in response to the force of the air flow created when the fan 20 is rotated in one direction or the other. From either of the outlet ports 23 or 25, the heated air passes outward through the common outlet 26 into a transverse heated air distribution duct 30 from which it escapes through multiple heated air outlets 32 into the interior of the passenger compartment (not shown).

The cold air from outside the automobile enters a fan chamber 34 through an air intake port or passageway 36 (FIG. 2) opening into the center of the fan chamber 34. The fan 20 is mounted on a vertical shaft 38 journaled at top and bottom in upper and lower bearings 40 and 42 and driven by a reversible electric motor 44 supported by a bracket 46 mounted on top of the cross duct 18 and energized by electric current from the engine-driven alternator or storage battery (not shown) with which modern automobiles are equipped. The electric heater 22 has an electric heating wire coil 48 energized by wires (not shown) connected to the alternator citcuit of the automobile by way of a control switch (not shown). The alternator (not shown) is driven from the automobile engine in the conventional way. The hot liquid heater or heat exchanger 24 contains a tubular liquid heating coil 50, hot coolant liquid for which is supplied through pipes 52 and 54 connected to the engine cooling system.

In the operation of the invention, the operator on entering the car starts the engine and closes an electric fan motor reversing switch (not shown) which electrically connects the car storage battery and/or alternator to the electric heating coil 48 of the electric heater 22. At the same time, the closing of this switch causes electric current to reach the electric motor 44 of the fan 20 so as to cause it to rotate counterclockwise to draw in air through the air inlet port 36 from the outside of the fan chamber 34 and cross duct 18, and discharge this incoming air through the electric heating coil 48 of the electric heater 22 where it is heated and propelled through the converging branch outlet duct 14 to its outlet port 26. There its force swings the damper 28 counterclockwise to open the outlet port 23 of the duct 14 and to cause hot air to flow through the outlet port 26 into the transverse heated air distribution duct 30 and thence outward through the multiple air vents or outlets 32 into the passenger compartment of the automobile. At the same time, the counterclockwise swinging of the 28 has closed the branch outler port 25 of the converging branch outlet duct 16 from the non-yet sufficiently-heated coil 50 of the water heater 24. When the operator has determined that the water in the heat exchanger 24 has become hot enough by receiving other water or coolant liquid from the automobile radiator by way of the engine cooling system or when this is so determined thermostatically by a thermostatic switch (not shown) in an automatic manner, the current through the fan motor 44 is reversed by the reversing switch. This action de-energizes electric heater 22 and causes the fan 20 to rotate clockwise and propel incoming air through the now-heated liquid heating coil 50 of the liquid heater 24 and thence through the outlet port 25 of the converging branch outlet duct 16 where its force swings the damper 26 clockwise so as to close off the individual outlet 23 of the converging duct 14. The heated air then flows through the common outlet port 26 into the transverse heated air distribution duct 30 and thence through the outlets 32 into the passenger compartment.

I claim:

1. An auxiliary heating device for an automobile having an electrical supply circuit and an engine liquid cooling system, said heating device comprising
a housing structure including a main air inlet duct having therein a fan chamber with an outside air intake passageway leading thereto and also including first and second branch air outlet ducts connected to said main air duct at spaced locations thereon on opposite sides of said fan chamber,
said first and second branch outlet ducts having first and second individual air outlets respectively disposed remote from said main air inlet duct, an electric air heater disposed in the space between said fan chamber and said first branch air outlet duct and adapted to be electrically connected to the automobile electrical supply circuit, an engine liquid air heater disposed in the space between said fan chamber and said second branch air outlet duct and adapted to be connected to the automobile engine liquid cooling system, a reversible electric fan in said fan chamber constructed and arranged to draw outside air through said outside air intake passageway and to discharge the thus indrawn air into either said first branch outlet duct or said second branch outlet duct in response to rotation of said reversible electric fan in opposite directions, a heated air distribution duct connected to said first and second branch air outlet ducts and disposed in communication with said first and second individual air outlets thereof and having heated air discharge means, and damper means disposed adjacent said first and second branch duct outlets and selectively movable alternately between opposite positions simultaneously opening communication between the one of said individual branch duct outlets through which air is discharged by the fan and said heated air distribution duct and closing communication between the other of said individual branch duct outlets and said heated air distribution duct.

2. An auxiliary automobile heating device, according to claim 1, wherein said branch duct outlets are disposed adjacent one another, and wherein said damper means comprises a single damper swingable alternately between said branch duct outlets.

3. An auxiliary automobile heating device, according to claim 2, wherein said heated air distribution duct has a heated air intake port therein disposed adjacent said damper and in proximity to said individual branch duct air outlets.

4. An auxiliary automobile heating device, according to claim 3, wherein said heated air distribution duct is elongated and said heated air discharge means comprises a plurality of heated air outlets disposed in spaced relationship to one another therealong.

5. An auxiliary automobile heating device, according to claim 1, wherein said damper means is mounted for free swinging motion between said opposite positions in response to the flow of heated air from said reversible fan.

6. An auxiliary automobile heating device, according to claim 1, wherein said branch air outlet ducts of said housing structure are disposed in converging relationship from said main air inlet duct.

7. An auxiliary automobile heating device, according to claim 6, wherein said individual outlets and said heated air intake port of said heated air distribution duct are disposed in close proximity to one another adjacent the point of convergence of said branch air outlet ducts.

8. An auxiliary automobile heating device, according to claim 6, wherein said housing structure is of approximately triangular configuration.

9. An auxiliary automobile heating device, according to claim 8, wherein said heated air distribution duct is disposed approximately parallel to said main air inlet duct.

* * * * *